United States Patent [19]
Wozar

[11] Patent Number: 5,301,961
[45] Date of Patent: Apr. 12, 1994

[54] CHUCK FOR TOOL, WORKPIECE, ETC.

[75] Inventor: Joachim A. Wozar, Esslingen, Fed. Rep. of Germany

[73] Assignee: Otto Bilz, Werkzeugfabrik GmbH & Co., Ostfildern, Fed. Rep. of Germany

[21] Appl. No.: 989,768

[22] Filed: Dec. 14, 1992

[30] Foreign Application Priority Data

Dec. 20, 1991 [DE] Fed. Rep. of Germany ... 9115854[U]

[51] Int. Cl.⁵ .............................................. B23B 31/20
[52] U.S. Cl. ...................................... 279/46.2; 279/48; 279/49
[58] Field of Search ............... 279/2.17, 46.1, 46.2, 279/48, 49, 52, 54, 56, 59, 90, 91; 403/370–372

[56] References Cited

U.S. PATENT DOCUMENTS

| | | | |
|---|---|---|---|
| 2,755,093 | 7/1956 | Peter et al. | 279/48 |
| 2,801,858 | 8/1957 | Spieth | 279/2.17 |
| 3,894,743 | 7/1975 | Hiroumi | 279/48 X |
| 4,106,783 | 8/1978 | Glimpel | 279/2.17 |
| 4,377,292 | 3/1983 | Staron | 279/52 X |

FOREIGN PATENT DOCUMENTS 3020522  10/1981  Fed. Rep. of Germany.

Primary Examiner—Steven C. Bishop
Attorney, Agent, or Firm—Michael J. Striker

[57] ABSTRACT

A chuck for a tool, a workpiece and the like has a chuck body having an inner receptacle, a clamping device accommodated in the inner receptacle and having axially projecting spring regions, the clamping device having two ends which are axially supported and being axially compressible for clamping an element in an interior of the clamping device and an element for applying a compressing force to the clamping device at a front end of the chuck body.

16 Claims, 1 Drawing Sheet

CHUCK FOR TOOL, WORKPIECE, ETC.

BACKGROUND OF THE INVENTION

The present invention relates to a chuck for workpieces, etc.

More particularly, it relates to a chuck which has a chuck body having an inner receptacle and a clamping device with axially projecting spring regions.

Chucks of the above mentioned general type are known in the art. One of such chucks is disclosed for example in the German reference DE-OS 3,020,522. The chuck disclosed in this reference has a receptacle with a clamping device formed as a two-part clamping sleeve with two axially projecting spring rings and a spacer ring between them. The chuck body, especially its inner receptacle is closed with an end cover which is one piece with the chuck body, forwardly and at the location where the tool, the workpiece, etc. is connected with the shaft. The end cover has an insertion opening for insertion of the shaft and also has an inner axial abutment for the end of the spring ring which with its another end abuts against the spacer ring. A special, clamping spring sleeve is provided at the rear side of the further inwardly located second spring ring and presses through a ring axially against the rear end side of the inwardly located spring ring. Therefore the axial forces produced for clamping both axially spaced spring rings from the rear side of the chuck and there by means of the spring sleeve. This is complicated and expensive and also limits further design possibilities and use possibilities for the chuck.

SUMMARY OF THE INVENTION

Accordingly, it is an object of the present invention to provide a chuck which avoids the disadvantages of the prior art.

In keeping with these objects and with others which will become apparent hereinafter, one feature of the present invention resides, briefly stated in a chuck in which the axial force for clamping the clamping device is effective at the front end of the chuck body.

When the chuck is designed in accordance with the present invention, it is simple, cost-favorable, space saving and operationally reliable. It insures fast clamping or exchange of the tool, workpiece and the like to be clamped, and it can be also designed at the rear side of the insertion location of the shaft in any desired manner.

Since the axial force for clamping of the clamping device is effective at the front end of the chuck body, for example is applied by means of a pressure piece, a fast clamping or unclamping and a fast exchange of a tool, workpiece and the like to be clamped is possible. The rear region of the chuck is not used for the clamping device and therefore is available so that it can be designed in different ways and thereby the chuck itself can also be formed in different ways. It is to be understood that the chuck can be formed for example as quick exchange chuck or as a one-piece chuck or the like.

The rear region of the chuck which is not acted upon for clamping can also have various adaptor surfaces and the like, for adapting the chuck to suitable holders or mounting the chuck on them. The simple, price-favorable and compact structure of the clamp in accordance with the present invention is of a great advantage. An additional spring sleeve for acting on the clamping device is not required. The clamping device is designed as a one-piece component which, when needed, can be removed quickly from the receptacle in the chuck body and replaced with a new one.

It is further advantageous that by means of the spring regions of the clamping device a reliable clamping of an inserted shaft in its peripheral direction is obtained and a maximum uniformly distributed clamping force acting around it is produced. The remaining, non-springy and non-clamping parts of the clamping device can contribute to centering and guiding of the one-piece shaft of a tool, a workpiece and the like. This is true especially for the centering rings provided at the both ends and/or for the central supporting ring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
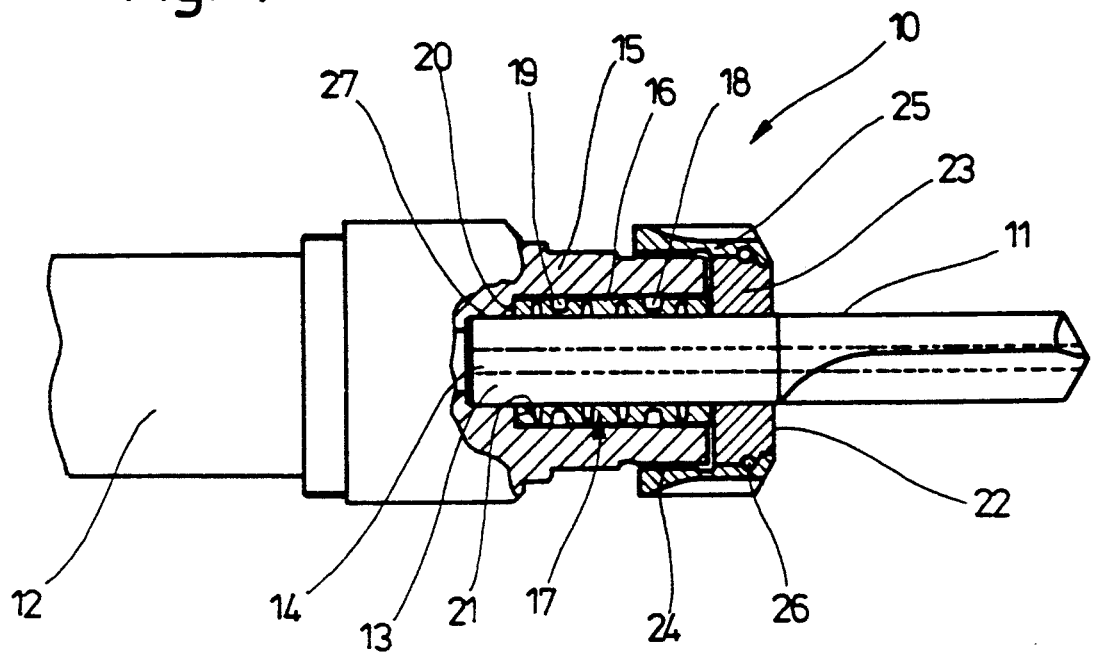
FIG. 1 is a side view which schematically shows a clamping chuck in accordance with the present invention.

A chuck for clamping a tool 11 or a not shown workpiece or the like in accordance with the present invention is identified as a whole with reference numeral 10. In FIG. 1 only the right forward part which serves for clamping the tool 11 is shown and will be described hereinbelow. The chuck 10 can be formed in many different ways. At the rear side it has a base body 12 which serves for example for holding the chuck in a machine. The tool 11 is inserted with its shaft 13 into the chuck and fixed in the latter. In the shown embodiment the tool 11 is provided with a passage 14 for supplying a cooling medium to a front end of the tool 11.

The chuck 10 has a chuck body 15 with an inner receptacle 16 which is open at its front end. A clamping device identified as a whole with reference numeral 17 is accommodated in the receptacle 16. The clamping device 17 has axially projecting spring regions which in the shown embodiment include two axially projecting spring regions 18 and 19. The clamping device is supported at the end side and is axially compressed for clamping the shaft 13 located in the receptacle 16. The details of the clamping device 17 will be explained hereinbelow.

The axial force for clamping the clamping device is applied at the front end of the chuck 15 which is the right end in FIG. 1. The rear end of the clamping device 17 which is the left end in FIGS. 1 and 2, and which faces away from the front axial front application, is axially supported directly on the chuck body 15. For this purpose the chuck body 15 has an inner ring collar 20 with an axial supporting surface 21 for the left end of the clamping device.

A front pressing piece 22 is held on the front end of the chuck 15 which is the right end in FIG. 1, so that it is adjustable in an axial direction. The pressing piece 22 presses against the front end of the clamping device 17 which is the right end in FIGS. 1 and 2. The pressing piece 22 has a disc 23 and is held on the chuck body 15 directly or indirectly by a thread. It is adjustable in an axial direction as will be explained hereinbelow.

In accordance with a not shown embodiment, the chuck body 15 is provided at its front end with an inner thread, and the pressing piece 22 (in particular the disc 23) is screwed in it with its outer thread.

In contrast, in the shown example the chuck body 15 has an outer thread 24, and a nut 25, a threaded sleeve, a threaded ring or the like is screwed on it. The nut 25 carries the pressing member 22, in particular the disc 23. In accordance with a not shown embodiment the nut 25, the threaded sleeve, the threaded ring and the like can be fixedly connected, for example of one piece with the pressing member 22, in particular the disc 23. Instead of this, in the shown embodiment the nut 25 in an advantageous manner are rotatably coupled with the pressing member 22, especially the disc 23. The coupling is achieved in particular by the intermediate rolling bodies 26 which for example form a ball bearing. As shown in FIG. 1 the disc 23 with its inner surface is spaced by sufficient distance from the end side of the front end of the chuck. Therefore, when needed a post clamping is possible by further screwing of the nut 25 on the outer thread 24. The clamping device 17 abuts with its right end in FIGS. 1 and 2 against the associated surface of the disc 23. Therefore, by screwing the nut 25 onto the outer thread 24 of the clamping device 17, the clamping device 17 is axially compressed and thereby the shaft 13 of the tool 11 is clamped. The rear end of the shaft 13 in FIG. 1 can be received in a matching opening 27 and additionally centered.

Figure 2:
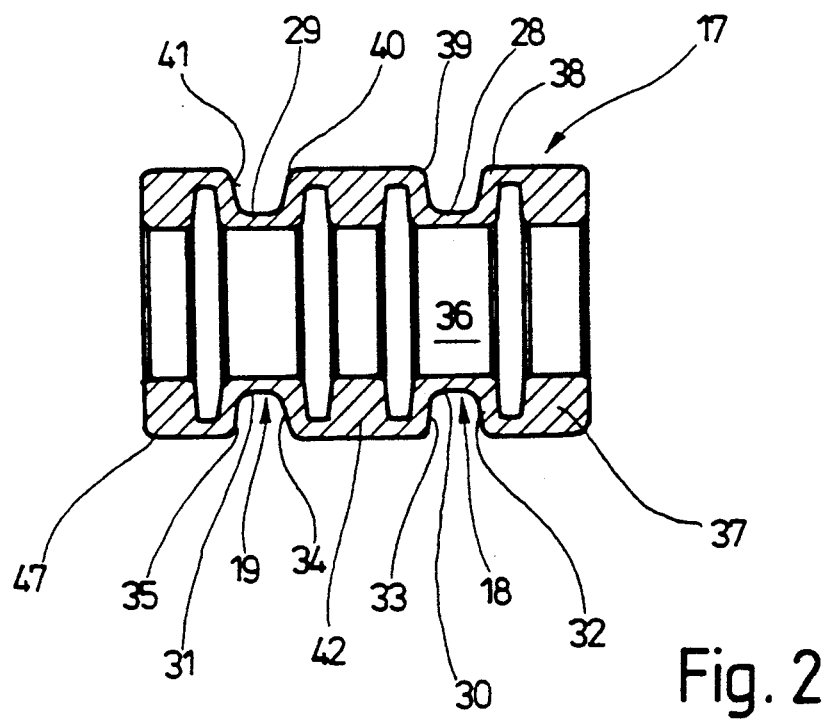
FIG. 2 is a view showing an axial longitudinal section of a clamping device of the chuck of FIG. 1 on an enlarged scale.

FIG. 2 shows specific details of the clamping device 17. The clamping device 17 at its left end and at its right end has non-springy and non-clamping centering rings 37 and 47. The centering rings 37 and 47 have a relatively wide cross-section. In accordance with an example of the specific sizes for the device, the centering rings can have an inner diameter of 10 mm with for example a very narrow tolerance of 0.006 mm. A central supporting ring 42 is provided symmetrically between both centering rings 37 in the center of the axis. It is also non-springy and non-clamping. The center supporting ring 42 has also relatively wide cross-section. Similarly to the centering ring 37 and 47, the central ring 42 is composed of a solid material and located, with respect to the total length of the clamping device 17, exactly in the center of the axial distance between the end centering rings 37 and 47. The central supporting ring 42 in the specific example has an inner diameter of 10 mm with a tolerance of for example +0.02 mm.

The spring regions 18 and 19 are located between the end centering rings 37 and 47 on the one hand and the central supporting ring 42 on the other hand. Each spring region 18, 19 has a spring ring 28 and 29 correspondingly. Each spring ring 28, 29 is formed of one piece with the neighboring centering ring 37, 47 and with the central supporting ring 42. Each spring ring 28, 29 has a substantially U-shaped recess 30, 31 in its ring surface. The recesses 30, 31 are radially outwardly open and designed as circular ring grooves. The recess 30 is limited at each side by a flank 32 and 33. In the same way the recess 31 is limited at each side by a flank 34 and 35. Radially outer bush-like rings 38, 39 are connected with the flanks 32 and 33. They connect the spring ring 28 to make it one piece with the centering ring 37 and the central supporting ring 42. In the same manner, the radially outer bush-shaped ring 40, 41 is connected with the flanks 34, 35 of the recess 31 and connect the spring ring 29 of one-piece with the central supporting ring 42 and the left centering ring 47.

The thusly designed spring regions 18, 19 during compressing of the clamping device 17 provide for the radial clamping of the shaft 13, since only the spring regions 18, 19 have a clamping base surface which serves for clamping of the shaft 13. The bush-shaped rings 38–41 in the transition region from the spring rings 28–29 to the neighboring centering ring 37, 47 on the one hand and the central supporting ring 42 on the other hand, form hinge points. During the axial compression of the clamping device 17 the hinge points allow for a conversion of the axial force into a radial clamping force and a clamping in the region of the spring regions 11, 18, 19. In the presented example of the clamping device 17 each spring region 18, 19 has for example an inner diameter of 10 mm with a tolerance plus +0.06 mm. It is however to be understood that the dimensions are valid only for this specific example and other dimensions are also possible within the spirit of the present invention.

What is especially important for the construction of the clamping device 17 is that its relatively cross-section-thick centering rings 37 and 47 at its both ends and its relatively cross-section-thick central supporting ring 42 do not represent deformable portions, but serve only for supporting the spring regions 18 and 19 which are located between them. The deformations occur in the region of the above described hinge locations and in particular at locations where the spring rings 28, 29 are connected of one piece axially to the respective neighboring centering rings 37 and 47 on the one hand and the central supporting ring 42 on the other hand. The spring regions 18, 19 form deformable pressure sleeve portions which produce the radial clamping force for clamping the shaft 13. The tolerance fit of both spring regions 18 and 19 is identical.

For clamping a tool 11 in the chuck 10, the nut 25 is first sufficiently unscrewed from the outer thread 24 so as to permit relaxing of the clamping device 17. Therefore during insertion of the tool 11 into the clamp 10 the shaft 13 is insertable into the interior opening 36 of the clamping device 17. Then the nut 26 is screwed onto the outer thread 24, and thereby the clamping device 27 is axially compressed through the pressing piece 24, and in particular the disc 23, until its spring regions 18, 19 apply a sufficient radial clamping force to the shaft 13.

It will be understood that each of the elements described above, or two or more together, may also find a useful application in other types of constructions differing from the types described above.

While the invention has been illustrated and described as embodied in a chuck, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A chuck for a tool or a workpiece comprising a chuck body having an inner receptacle; a clamping device accommodated in said inner receptacle and having axially projecting spring regions, said clamping device having two ends which are axially supported and being axially compressible for clamping an element in an interior of said clamping device; and means for applying a compressing force to said clamping device at a front end of said chuck body, said clamping device at its each end being provided with a non-springy and non-clamping centering ring.

2. A chuck as defined in claim 1, wherein said ends of said clamping device have a rear end which is opposite to said front end of said chuck body and which directly abuts against said chuck body.

3. A chuck as defined in claim 2, wherein said chuck body has an inner ring collar provided with an axial supporting surface against which said rear end of said clamping device abuts.

4. A chuck as defined in claim 1, wherein said compressing means includes a pressing member which is adjustable relative to said chuck body in an axial direction and axially presses against a front end of said clamping device.

5. A chuck as defined in claim 4 wherein said pressing member includes a disc pressing against said front end of said clamping device.

6. A chuck as defined in claim 4, wherein said chuck body has a thread, said pressing member being held and adjustable in an axial direction on said thread of said chuck body.

7. A chuck as defined in claim 5, wherein said chuck body has a thread, said disc being held and adjustable in an axial direction on said thread of said chuck body.

8. A chuck a defined in claim 4, and further comprising a holding member for holding said pressing member, said chuck body having an outer thread, said holding member being screwed on said outer thread of said chuck body.

9. A chuck as defined in claim 8 wherein said holding member is formed as a nut.

10. A chuck as defined in claim 8, wherein said holding member is turnably coupled with said pressing member; and further comprising means for turnably coupling said holding member with said pressing member.

11. A chuck as defined in claim 10, wherein said means for turnably coupling said holding member and said pressing member include a plurality of rolling bodies.

12. A chuck as defined in claim 1, wherein said clamping device is further provided with a non-springy and nonclamping central supporting ring located between said centering rings.

13. A chuck as defined in claim 12, wherein each of said spring regions is located between one said centering rings and said central supporting ring and forms at least one inner clamping location for clamping the elements received in said clamping device.

14. A chuck as defined in claim 13, wherein each of said spring regions is formed as a spring ring which is of one piece with a respective one of said centering ring and said supporting ring.

15. A chuck as defined in claim 14, herein each of said spring rings has an outer surface provided with a substantially U-shaped, circumferential and radially outwardly open recess.

16. A chuck as defined in claim wherein each of said U-shaped recesses has two flanks which are radially outwardly connected with substantially bush-shaped rings, said bush-shaped rings connecting said spring rings with said central supporting ring and said centering rings of one piece with one another.

* * * * *